(12) United States Patent
Morley (10) Patent No.: US 6,851,739 B2
(45) Date of Patent: Feb. 8, 2005

(54) HARD TOP CONVERTIBLE FOR JEEP-TYPE UTILITY VEHICLE

(76) Inventor: Daniel Morley, 270-18 77th Ave., New Hyde Park, NY (US) 11040

( * ) Notice: Subject to any disclaimer, the term of this patent is extended or adjusted under 35 U.S.C. 154(b) by 0 days.

(21) Appl. No.: 10/610,910

(22) Filed: Jul. 2, 2003

(65) Prior Publication Data

US 2005/0001446 A1 Jan. 6, 2005

(51) Int. Cl.$^7$ .................................................. B60J 1/00
(52) U.S. Cl. ........................ 296/102; 296/103; 296/141; 280/756
(58) Field of Search ................................ 296/102, 103, 296/141, 190.03; 280/756

(56) References Cited

U.S. PATENT DOCUMENTS

| 654,993 | A | * | 7/1900 | Martin ........................ 296/141 |
| 1,413,424 | A | * | 4/1922 | Peczenik ...................... 296/213 |
| 3,882,921 | A | * | 5/1975 | Sandall ........................ 160/266 |
| 4,842,326 | A | | 6/1989 | DiVito |
| 5,009,465 | A | | 4/1991 | Induni |
| 5,738,405 | A | * | 4/1998 | Richters et al. ......... 296/193.03 |
| 5,803,529 | A | | 9/1998 | Perry-Bores et al. |
| 5,992,917 | A | | 11/1999 | Hilliard et al. |
| 6,189,962 | B1 | * | 2/2001 | Henderson ................... 296/218 |

FOREIGN PATENT DOCUMENTS

| GB | 2099377 | * | 12/1982 | ................... 296/102 |

* cited by examiner

*Primary Examiner*—Dennis H. Pedder
(74) *Attorney, Agent, or Firm*—Richard C. Litman (57) ABSTRACT

A hard top and soft top convertible system for a Jeep-like vehicle which includes, in one embodiment, a replacement for the conventional roll-bar cage with a roll-bar frame that is aligned with the outer edges of the vehicle. The roll-bar frame is made of high strength metal, acting as a substitute for the conventional roll bar. The top includes removable outer hard top, side windows and rear window. The top includes pliable inner soft top, side windows, and rear window, each of which may be rolled into a stored position within the frame using electric motors for open air use of the vehicle. Another embodiment employs a similarly configured frame which is provided in a set of pieces which are assembled over an existing roll bar frame of the Jeep-like vehicle.

20 Claims, 10 Drawing Sheets

HARD TOP CONVERTIBLE FOR JEEP-TYPE UTILITY VEHICLE

BACKGROUND OF THE INVENTION

1. Field of the Invention

The present invention relates to vehicles. More particularly, the present invention relates to a combined hard top, roll bar, and convertible top for a Jeep-type utility vehicle.

2. Description of the Related Art

It is known to provide hard tops, some with removable window panels, for a Jeep-type utility vehicle. It is also known to provide a hard top-soft top combination system where the soft top must be placed in a stored position or removed from the vehicle when the hard top is placed on the vehicle. Such systems require substantial handwork to place the desired top in position. The design of these top systems must work around existing roll bars. It would be desirable to provide a top system for a Jeep-type vehicle which provides both hard-top and soft top and require a minimal amount of handwork in its conversion and use. It would also be desirable to provide such a system where the soft top system is electrically operated. It would further be desired that the system act as its own roll bar or, in another embodiment, fit over an existing roll bar.

U.S. Pat. No. 5,009,465, issued Apr. 23, 1991, to Induni, et al., describes an automobile roof covering for a T-type top which can be rolled for storage.

U.S. Pat. No. 5,738,405, issued Apr. 14, 1991, to Righters et al., describes a hard top roof structure which can be manually dismantled into individual parts including a lamellar roof, a lowerable rear window, removable side windows, and a supporting frame for the roof structure. A soft top may be substituted for the hard top in the system. The hard top must be removed to allow mounting of the soft top in the top frame system.

U.S. Pat. No. 5,803,529, issued Sep. 8, 1998, to Perry-Bores et al., describes a system for removably covering the rear portion of a Jeep-type vehicle with a soft top.

U.S. Pat. No. 5,992,917, issued Nov. 30, 1999, to Hilliard et al., describes a system having a soft top and a removable hard top for a Jeep-type vehicle. The hard top must be removed before raising the soft top.

U.S. Pat. No. 4,8842,326, issued Jun. 27, 1989, to DiVito, R., describes motor vehicles with interchangeable body modules, including a hard top models.

None of the above inventions and patents, taken either singly or in combination, is seen to describe the instant invention as claimed. Thus a hard top and convertible top for Jeep-type vehicles solving the aforementioned problems is desired.

SUMMARY OF THE INVENTION

The hard top and soft top convertible system for a Jeep-type vehicle of the present invention includes, in one embodiment, a replacement for the conventional roll-bar cage with a roll-bar frame that is aligned with the outer edges of the vehicle. The roll-bar frame is made of high strength metal so as to act as a substitute for the conventional roll bar. The top includes removable rigid outer top, side windows and rear window. The rear window is mounted on hinges and a latch for partial opening. Pliable sheets serve as inner soft top and window covers. These sheets retract into the roll-bar frame, similar to an awning or a shade. Slotted tracks are incorporated into the roll-bar frame for providing a seal with the pliable top, sides, and rear. Electric motors are incorporated to retract and deploy the pliable sheets. Manual opening and closing may be used instead of electric motors. The pliable sheets may remain in place as desired while the rigid top and windows formed of plastic, glass, or metal may be installed on the rollbar frame.

In another embodiment, the system is assembled from a set of separate pieces over the conventional rollbar in place on the vehicle to attain the same general shape and functions, the separate pieces being made of plastic or other light-weight material.

Accordingly, it is a principal object of the invention to provide a combination hard top and convertible system for use on a Jeep-type vehicle wherein the soft top and sides may be opened or closed with the hard top in place.

It is another object of the invention to provide a system as above wherein rigid roof, sides, and rear window are removably mounted on the hard top and convertible system.

It is a further object of the invention to provide a system as above which serves as a roll bar or cage.

Still another object of the invention is to provide a system as above where the soft top, sides and rear window may be opened or closed by operation of electric motors.

Yet another object of the invention is to provide another embodiment of the system above wherein the system is assembled around an existing roll bar or cage.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a hard top and soft top convertible system for a Jeep-like vehicle which includes, in one embodiment, a replacement for the conventional roll-bar cage with a roll-bar frame that is aligned with the outer edges of the vehicle. The roll-bar frame is made of high strength metal so as to act as a substitute for the conventional roll bar. The top includes removable rigid top, side windows and rear window. The top includes pliable soft top, side windows, and rear window sheets, each of which may be rolled into a stored position within the frame using electric motors for open air use of the vehicle. Another embodiment employs a similarly configured frame which is provided in a set of pieces which are assembled over an existing roll bar frame of the Jeep-like vehicle.

Figure 1:
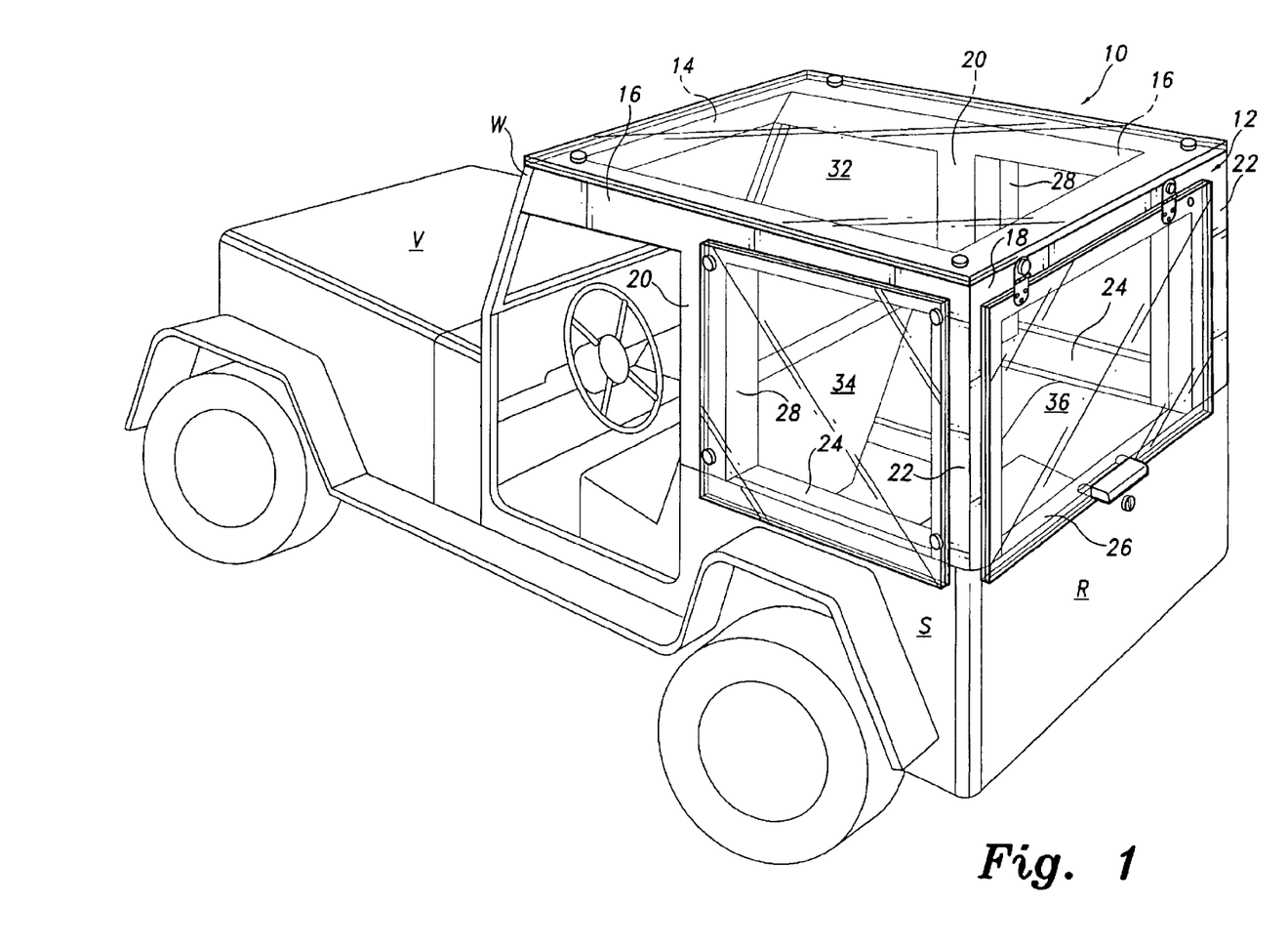
FIG. 1 is an environmental, perspective view of a hard top convertible jeep-like vehicle according to the present invention.
Figure 2:
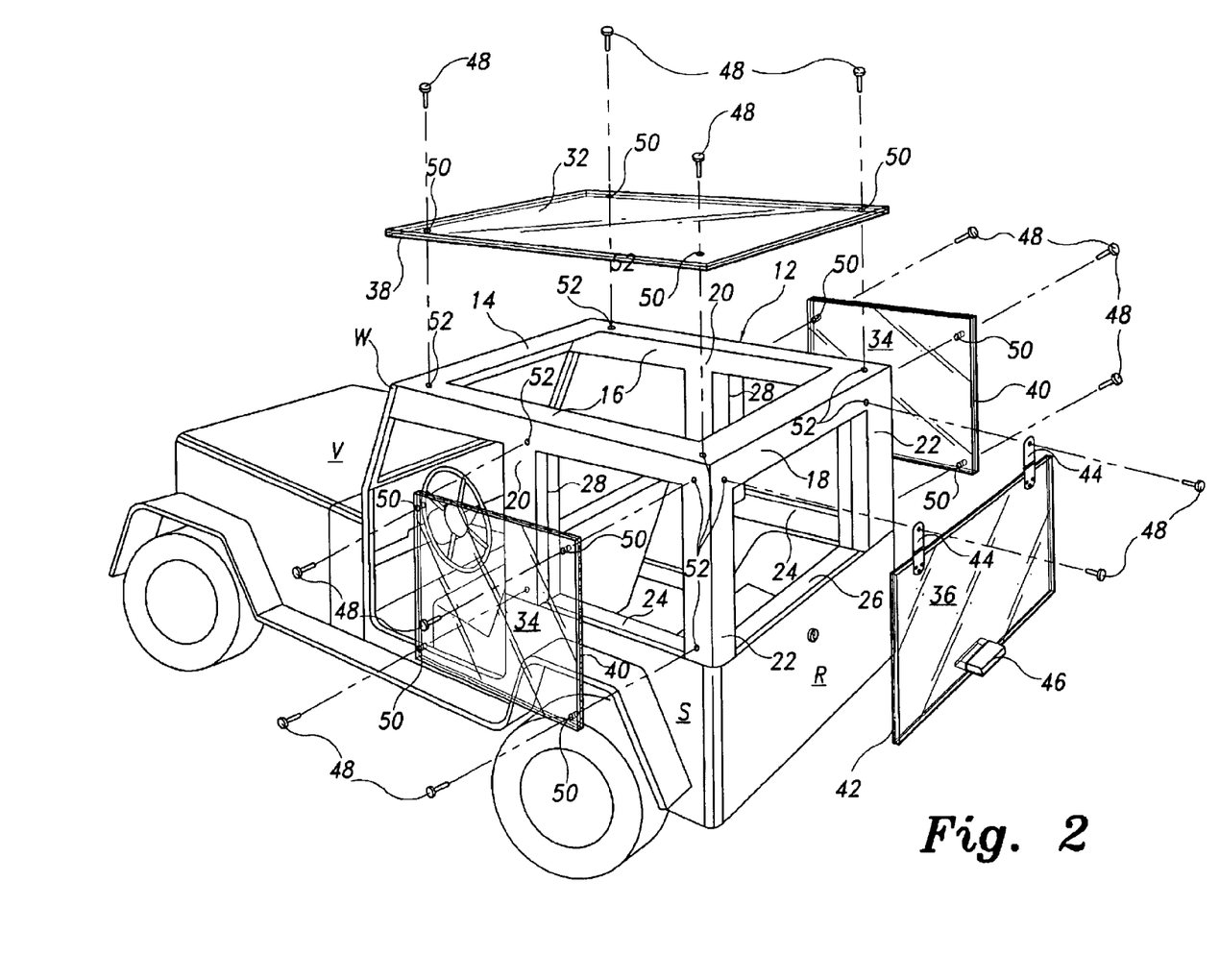
FIG. 2 is a partially exploded view of the hard top convertible of FIG. 1 showing the removable rigid roof, side windows and rear window broken away from the vehicle.

Referring to FIGS. 1 and 2 there are shown an environmental perspective view of the hard top configuration, of the present invention with hard top and removable outer rigid windows in place on the vehicle and exploded away, respectfully. The Jeep-like vehicle V has side panels S, rear panel R and windshield frame w upon which is mounted the inventive combination hard top convertible system 10. The system 10 has a roll cage or frame 12 made up of generally rectangular members which replace the roll bar cage of the vehicle. The frame members of the invention are made of high strength metal and securely attached to the vehicle V so as to function as an integral roll bar frame or cage.

The frame 12 has an upper front member 14 mounted to windshield frame W and to which are mounted upper left and right side members 16 extending lengthwise of the vehicle cabin and having front portions, central portions, and rear portions, respectively. An upper rear member 18 extends between the rearmost portions of upper side members 16, forming an upper rectangular top frame. Left and right upright side members 20 extend downward from the central portions of respective left and right upper side members 16 to the side walls of the vehicle at a point immediately behind the front seats at the door opening of the vehicle and firmly attached to the vehicle in a conventional manner (not shown) such as by bolts or welding.

Left and right upright rear members 22 extend between the rear corners of the upper frame portion and the respective rear upper corners formed by the side walls and rear wall of the vehicle and are securely attached to the vehicle in a manner similar to upright side members 20 to complete the roll bar cage. Side sills 24 extend between the side member slotted frame walls 28 of upright side members 16 and upright rear members 22 at their lower ends, respectively, forming left and right side window frames and a rear window frame and are even with the upper edge of side wall S of vehicle V. Rear sill 26 extends between the slotted frame walls 30 of upright rear members 22 at their lower ends, respectively, and are even with the upper edge of rear wall R of vehicle V. A removable outer rigid top 32 is attached to the top rectangular frame of frame 12 so as to serve as a vehicle roof and may be rigid transparent plastic or glass, or metal as desired.

Rigid outer side window panels 34 are attached to the respective side window frames to cover the side window openings created by the frame 12 and are preferably made of rigid transparent plastic or glass. Rigid outer rear window panel 36 is attached to the rear window frame by hinges 44 attached to upper rear member 18 so as to swing outward from frame 12 and is held in a closed position by handle latch 46 to cover the rear window opening at the rear R of the vehicle. Rigid rear window panel 36 is preferably made of transparent plastic or glass. Rigid top panel 32 has an elastomeric seal 38 around the edge thereof to seal against the top rectangular frame of frame 12 when mounted thereto. Rigid side window panels 34 have respective elastomeric seals 40 around their edges to seal against the side window frames of frame 12 and vehicle sides S when mounted thereon. Rigid rear window panel 36 has an elastomeric seal 42 to seal against the rear window frame of frame 12 when in the closed and latched position. The rigid top panel 32 and side panels 34 are held to frame 12 by hand screws 48 through respective through bores 50 and into hand screw receivers 52 in frame 12. The rigid rear window panel 36 is held to frame 12 by hand screws 48 through hinges 44 and into hand screw receivers 52 and by handle latch 46.

Figure 3:
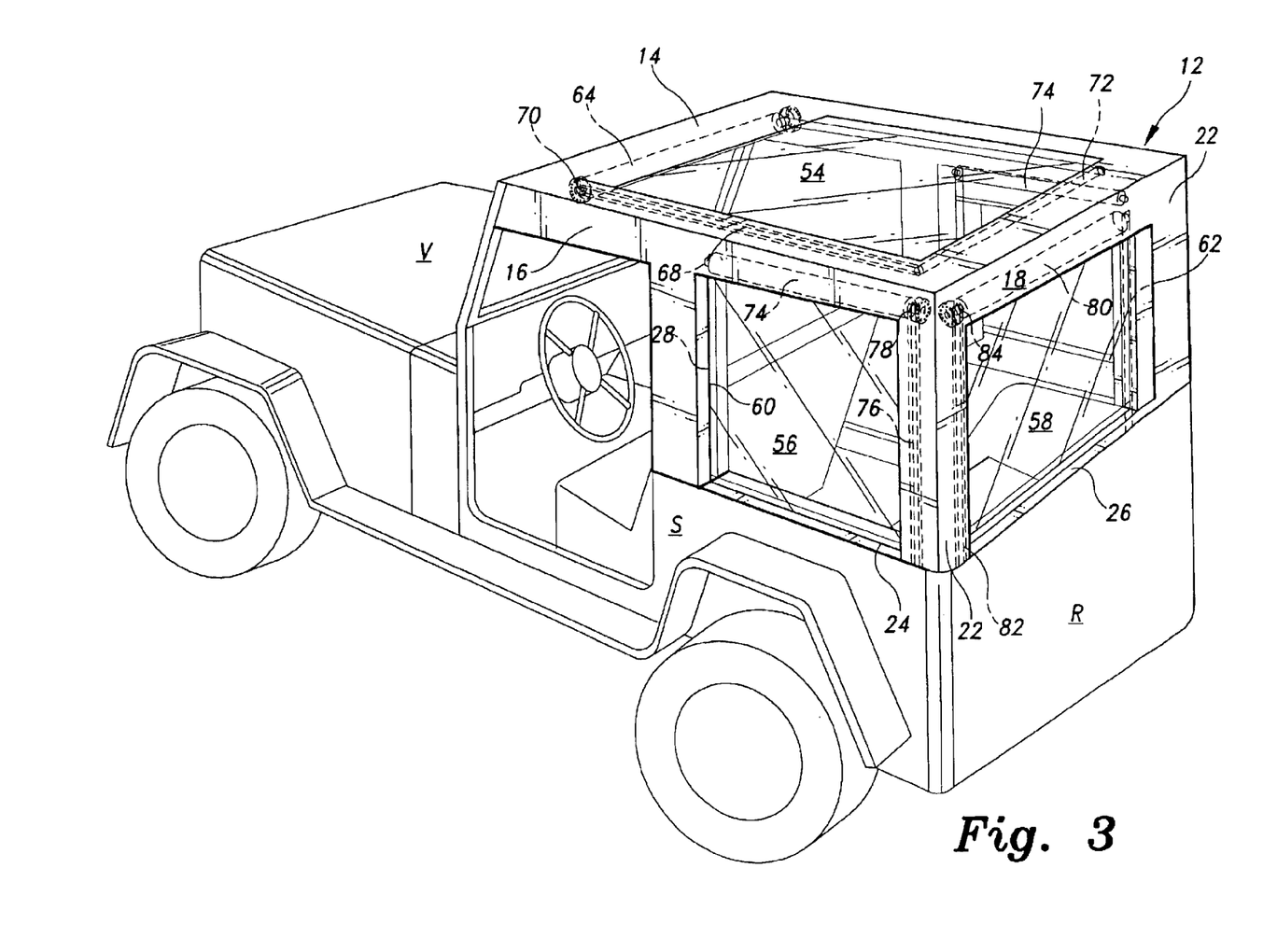
FIG. 3 is a perspective view of the hard top convertible of FIG. 1 with the soft top and soft sides and rear window in the closed position.
Figure 4:
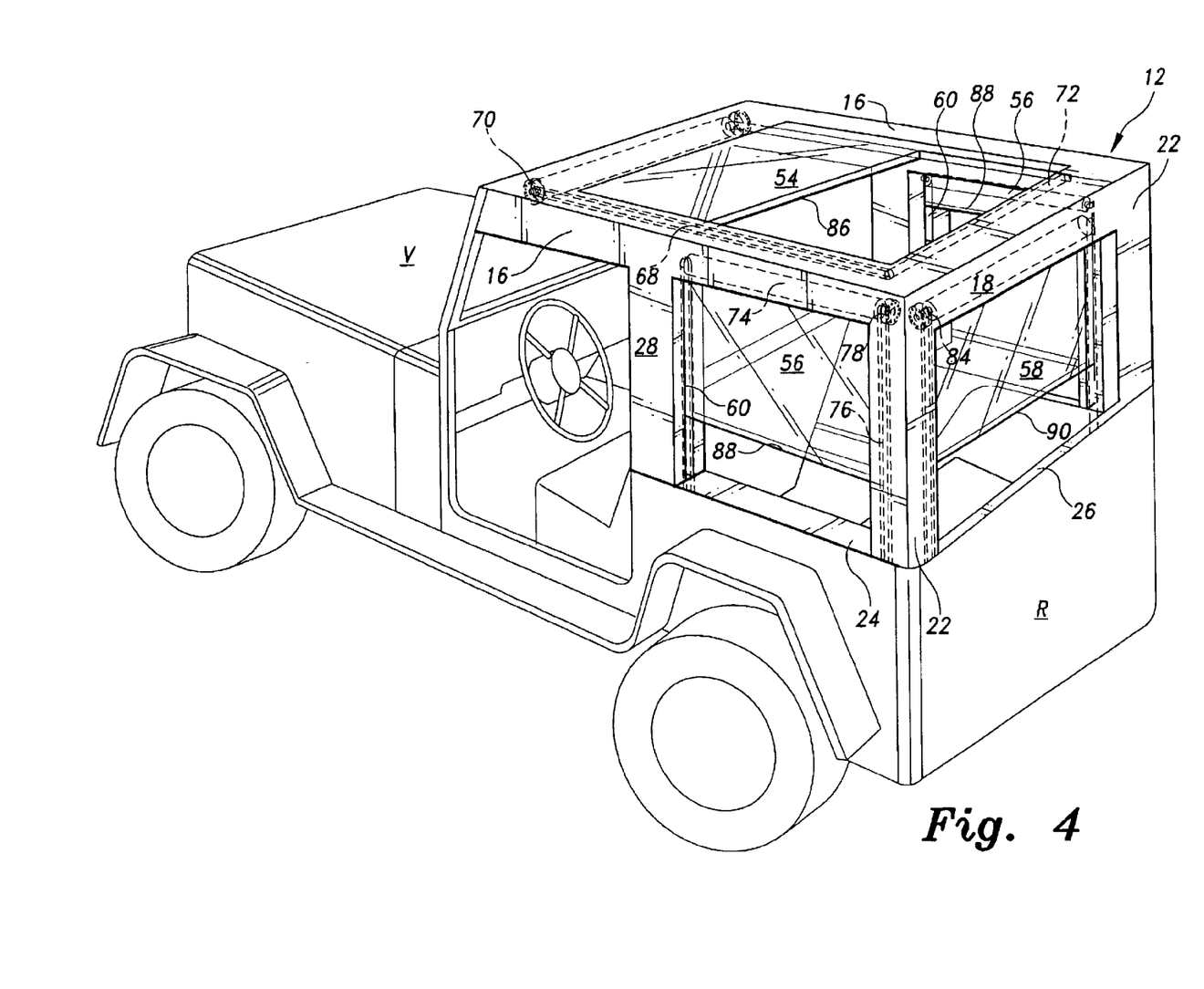
FIG. 4 is a perspective view similar to that of FIG. 3 with the soft top and soft sides and rear window partially open.
Figure 5:
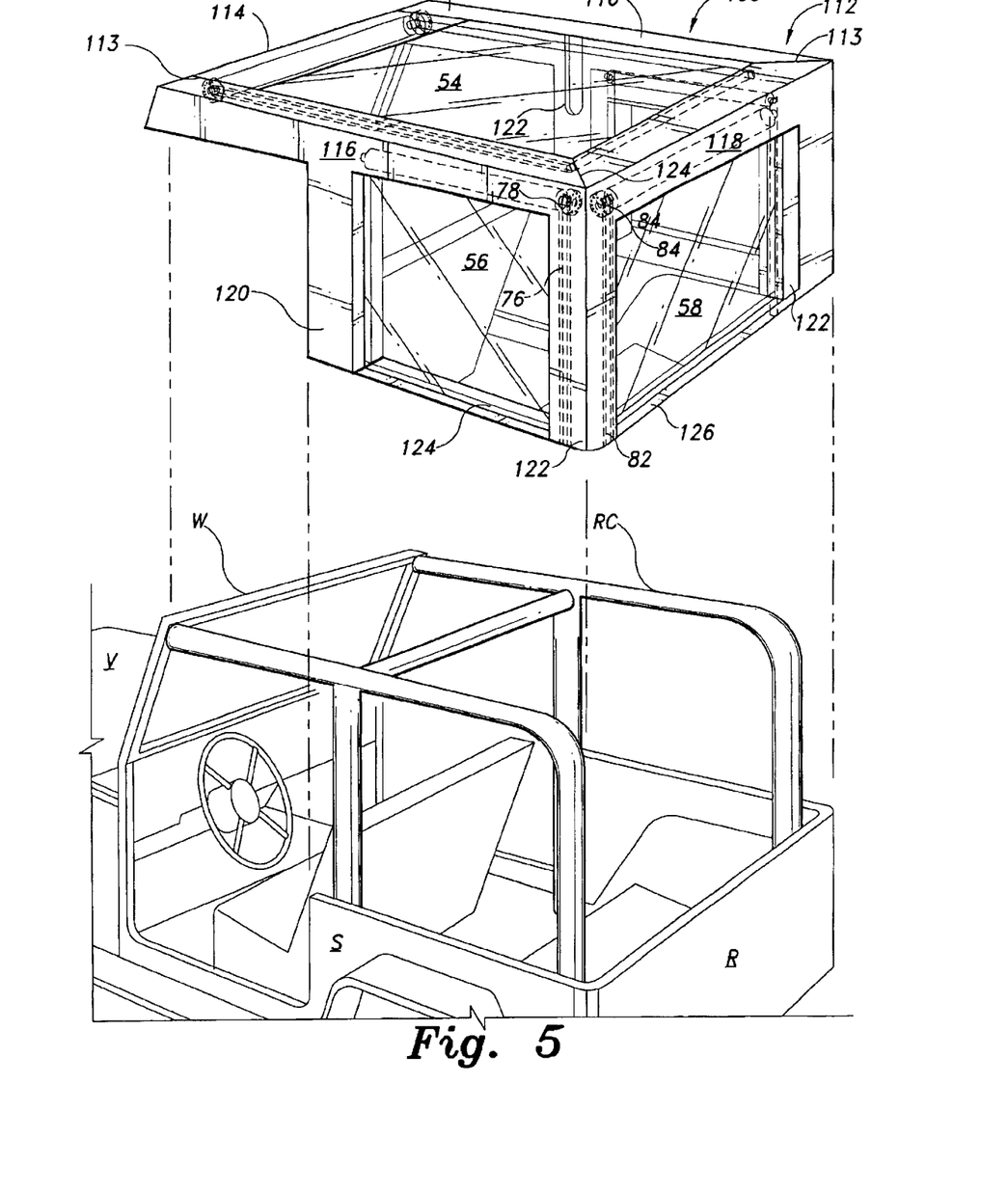
FIG. 5 is a partially exploded view of another embodiment of a hard top convertible similar to that of FIG. 3 with the original roll bar or cage of the vehicle in place.

Referring to FIGS. 3–5 there is shown an environmental perspective view of the inventive hard top and soft top convertible system with the outer rigid and top panels removed and the inner soft, pliable top closure 54, soft, pliable side window closure 56, and soft, pliable rear window closure 58 in the closed position. The soft top closure 54 and window closures 56 and 58 are made of pliable material such that they can be rolled around respective cylindrical spindles or rollers for storage within the frame of system 10.

The pliable side windows and rear window are preferably of transparent plastic. The soft top may be transparent, as shown, or opaque to provide shade. Soft inner pliable top 54 is attached to spindle 64 by known mechanical means so as to be rolled up thereon by actuation of soft top drive belt motor 70 to open soft top 54. Soft top drive belt motor 70 acts on belt 68 attached to soft top rod 86 to open soft top 54 and is reversible to rotate in the reverse direction when it is actuated to open soft top 54. The spindle 64 and motor 70 are hidden within upper front member 14 of frame 12. Belt 68 is hidden within an upper side member 16 and is turned at each end by pulleys and spools (see FIG. 6A). The idler shaft, belt, spools, and pulleys may be employed as in FIG. 6A to provide a more even rearward pull on the soft top rod 86. This system is more completely described below, referring to detail FIG. 6A.

The soft pliable inner side windows 56 and inner rear window 58 are made of clear, plastic pliable material and are shown in a closed position in FIG. 3, and a partially open position in FIG. 4, respectively. Soft side windows 56 travel in side window slots 60, and soft rear window 58 travels in rear window slots 62 so as to maintain a relatively weatherproof seal when the windows are in their closed position as in FIG. 3. Soft side windows 56 wind around soft side window rollers 74 when in an open position. To open the side windows 56, a drive belt 76, driven by a reversible drive belt motor 78, is attached to window rods 88 at the respective lower ends of the windows 56. The drive belt 76 is located within the upright rear members 22, as shown, or in the upright side members 20 as desired and turns at each end by pulleys and spools (see FIG. 7A).

Figure 7A:
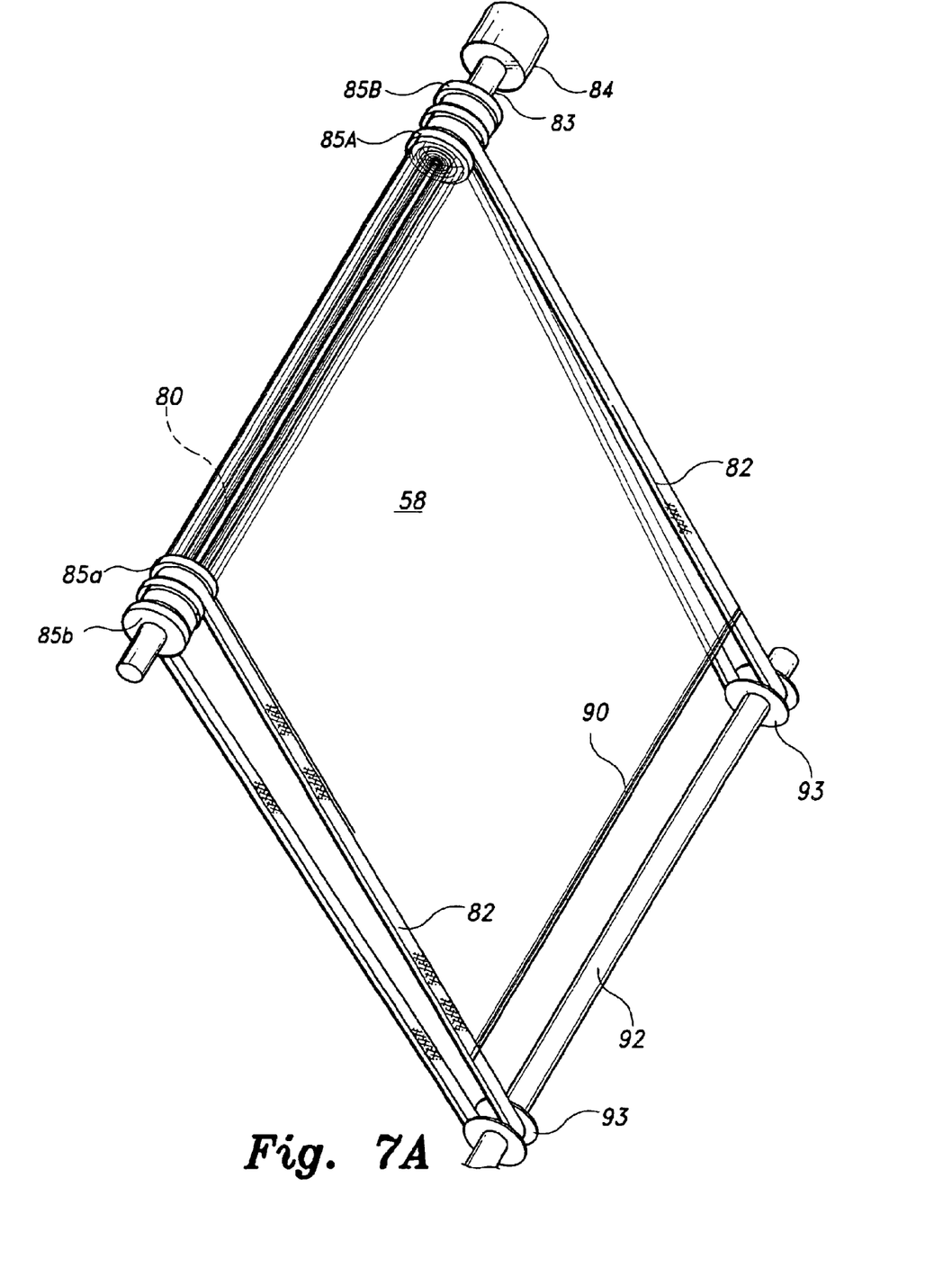
FIG. 7A is a detail view of the soft side and back window opening and closing mechanism of the present invention.

An idler shaft, belt, spools, and pulleys may be employed as in FIG. 7A to provide a more even downward pull on the window rods 88. The drive belt motor 78 as shown is shown mounted with the motor at the upper end of the window as in FIG. 3. The rollers 74 take up the window material as it is raised to the stored position. A spring-type shade roller may be used for rolling up slack in the pliable window in place of the motor driven belt.

Rear soft window 58 is mounted and operated in a similar manner to side windows 56 described above. Rear soft window 58 travels in rear window slots 62 so as to maintain a relatively weatherproof seal when in its closed position as in FIG. 3. Soft rear window 58 winds around soft rear window roller 80 when in an open position. Soft rear window drive belt 82 is driven by reversible rear window drive belt motor 84 around pulleys and spools as in the side windows, motor 84 being mounted in the upper end of the frame 12. The rear window rod 90 is attached to drive belt 82 for opening and closing the soft rear windows.

Referring to FIG. 5, there is shown an exploded view of another embodiment of the inventive hard top and convertible where a conventional roll bar cage is installed in the Jeep-like vehicle and the frame of the inventive hard top and convertible is of plastic or other lightweight material and is constructed with frame parts which attach around the conventional roll bar cage to form a hard top and convertible similar in operation to the first embodiment where the frame served as the roll bar cage.

The Jeep-like vehicle V has side panels S, rear panel R, and windshield frame W upon which is mounted another embodiment of the inventive combination hard top convertible system 100. The system 100 has a frame shell assembly 112 made up of generally rectangular members (as assembled) which are mounted around the roll bar cage RC of the vehicle V.

The frame shell is made of rigid plastic or other lightweight material The frame shell 112 is made up of attached portions (see FIG. 8), frame shell edges 113 being representative of many possible connection options. As assembled, frame shell 112 has an upper front member 114 mounted to windshield frame W and to which are mounted upper side members 116 extending lengthwise of the vehicle cabin. An upper rear member 118 extends between the rearmost portions of upper side members 116, forming an upper rectangular frame shell portion. Upright side members 120 extend downward from respective upper side members 116 to the side of the vehicle V at a point immediately behind the front seats at the door opening of the vehicle and are securely attached to the vehicle in a conventional manner (not shown) such as by bolts or welding.

Upright rear members 122 extend between the rear corners of the upper frame shell portion and the respective rear upper corners of the vehicle and are assembled around the roll bar cage RC in a manner similar to upright side members 120 to complete the roll bar cage shell 112. Side sills 124 extend between the side member slotted frame walls of upright side members 116 and upright rear members 122 at their lower ends, respectively, and are even with the upper edge of vehicle side wall S and rear wall R.

Frame portion edges 113 define a removable rigid hard top of rigid transparent plastic or glass, or metal, as desired, may be attached to the upper end of frame 112 as in FIGS. 1 and 2. Removable rigid side windows of transparent plastic or glass as in FIGS. 1 and 2 may be attached to the respective sides to cover the side window frame openings created by the frame shell 112.

A removable rigid rear window of transparent plastic or glass as in FIGS. 1 and 2 may be attached to the rear window frame created by frame shell 112 by hinges attached to upper rear member 118 so as to swing outward from frame shell 112 and is held in a closed position by a handle latch to the rear R of the vehicle. As in the first embodiment, the hard top and side windows are removably held to frame shell 112 by hand screws through respective through bores in the top and windows and into hand screw receivers in frame shell 112. The rear window is similarly held to frame shell 112 by hand screws through hinges and into hand screw receivers by a handle latch (see FIGS. 1 and 2).

As in FIGS. 1 and 2, storable soft, pliable top window closure 54, storable soft, pliable side window closures 56, and storable soft, pliable rear window closure 58 are mounted within the upper portion of upper frame 112 and are opened and closed by belts, spools and electric motors. For example as shown in hidden lines, the pliable side window closures 56 are raised and lowered by drive belt 76 and drive belt motor 78 and pliable rear window closure 58 is raised and lowered by drive belt 82 and drive belt motor 84.

Figure 6A:
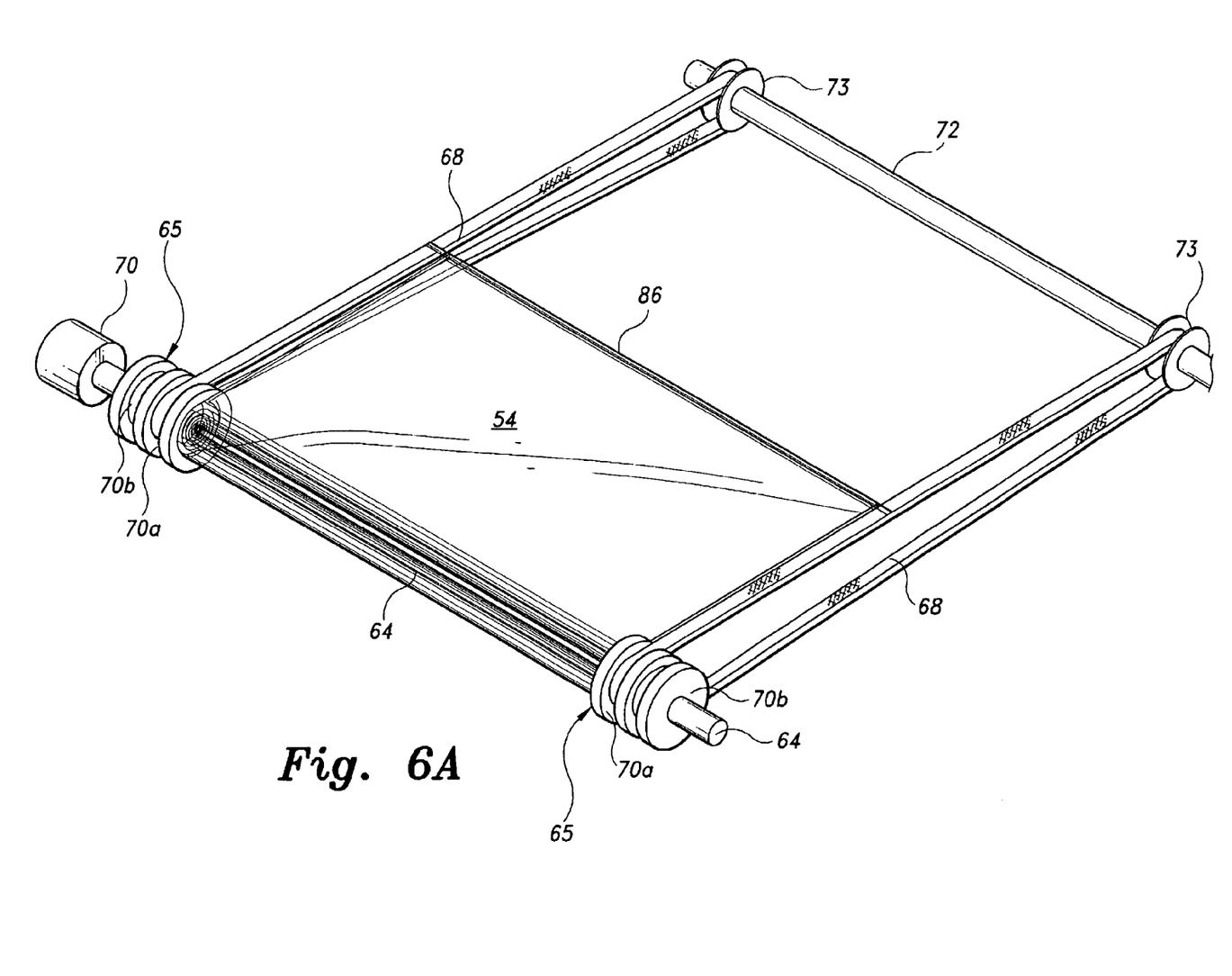
FIG. 6A is a detail view of the soft top opening and closing mechanism of the present invention.
Figure 6B:
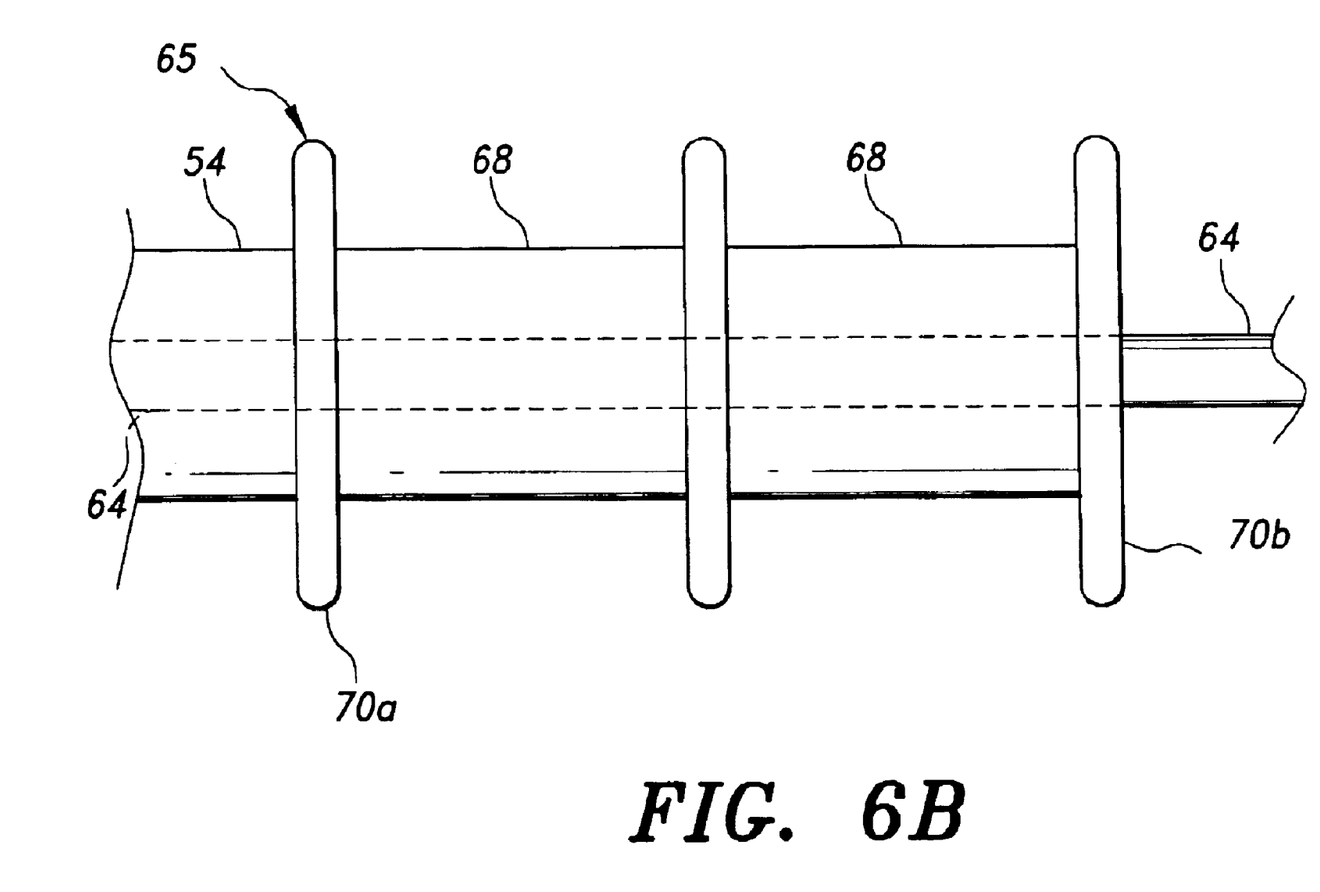
FIG. 6B is a front elevation view of the opening and closing mechanism of FIG. 6A.

Referring to FIGS. 6A and 6B, there is shown a detail views of the soft top opening and closing system useful in both embodiments of the invention as discussed above. Pliable soft top 54 is mounted to spindle 64 such as to roll up thereon upon energizing reversible electric motor 70, driving spindle 64. Spindle 64 and motor 70 is located in upper front member 14 of frame 12 (see FIG. 3). Soft top drive belts 68 are attached at each end to respective double spools 65 mounted to spindle 64 on opposite sides of pliable soft top 54. Double spools 65 each have an inner spool 70a and an outer spool 70b.

On each side of top closure 54, the upper portion of belt 68 is attached at its end (not shown) to inner spool 70a and the lower portion attached at its end to outer spool 70b such that upon rotation of spindle 64 in a direction to open top 54, belt 68 spools up on inner spool 70a while spooling down from outer spool 70b, the top 54 being fully wrapped on spindle 64 when belt 68 fills inner spool 70a. Belts 68 are supported by pulleys 73 mounted for rotation on axle 72 located in upper rear member 18 of frame 12 (see FIG. 3). Pulleys 73 are located even with inner spools 70a and soft top rod 86 is connected between the upper portions of belt 86 the rear of top closure 54 being connected at its rear edge to rod 86. Pulleys 73 may be separately supported in rear member 18 as an alternative to the axle 72.

Upon rotation of spindle 64 in a direction to close top 54, belt 68 spools up on outer spools 70b and spools down from inner spools 70a until the top 54 is fully extended. The thickness of belt 68 is preferably equal to the pliable material of top 54 so they wind and unwind at the same rate. The top 54 in FIG. 6A is shown midway between the open position and the closed position so belts 68 are equally spooled on spool 70a and 70b as better shown in FIG. 6B and the top 54 is wound to an equal level. The free end of spindle 64 and the free ends of axle 72 are mounted to frame 12 by bearings (not shown) so as to allow their rotation in a known manner.

A single belt mounted on spool 65 and pulley 73 may be used as shown in FIGS. 3–5, above, but the double pulley arrangement illustrated in FIG. 6A is a more robust design, avoiding any possible canting of the window rod 86 and resulting smoother operation of the top during opening or closing. Various bearings and supports for the system of FIG. 6A are well within the state of the art and are not shown for purposes of clarity. The electric motors are preferably driven from the vehicle electrical system and controlled by the operator of the vehicle.

Figure 7B:
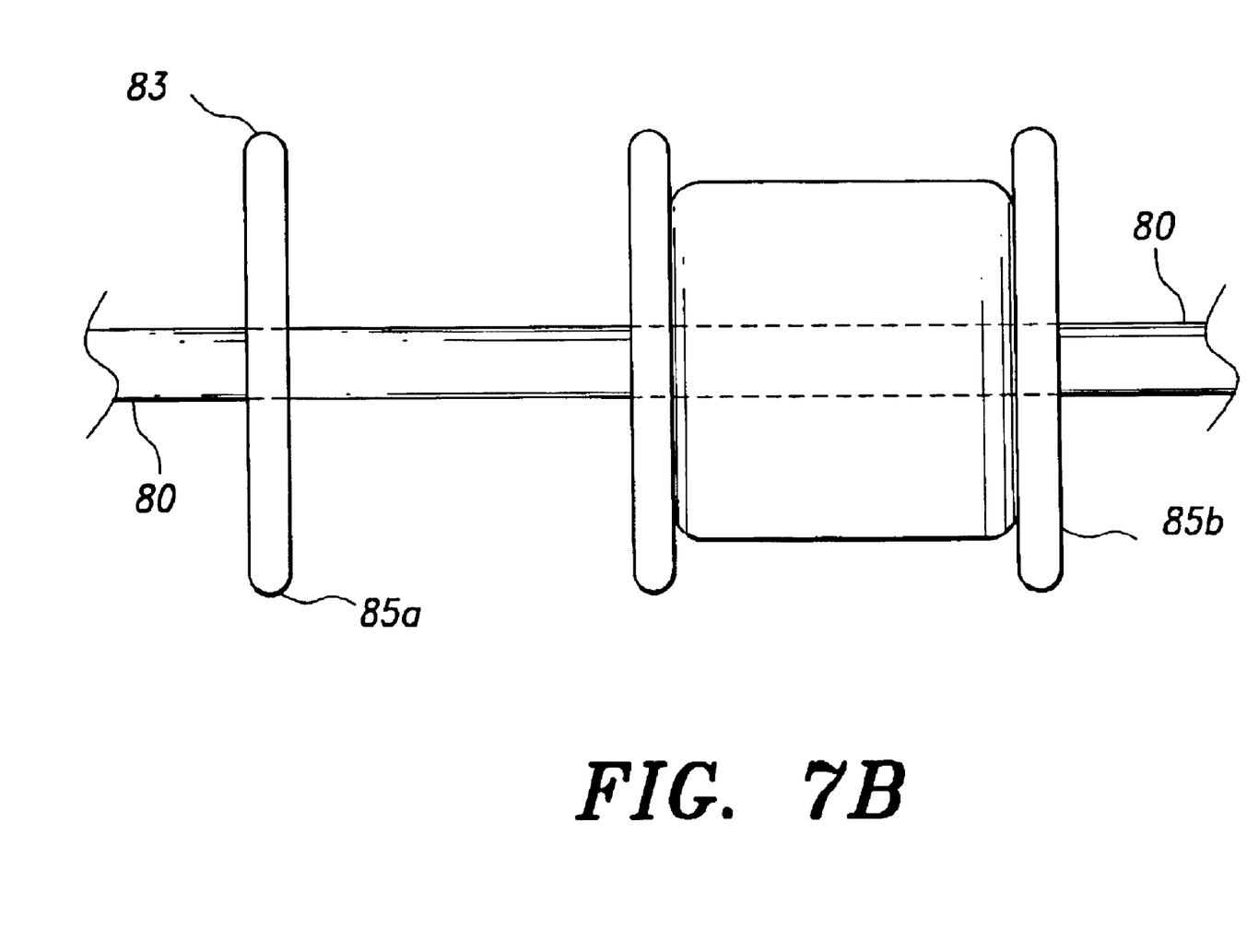
FIG. 7B is a top view of the opening and closing mechanism of FIG. 7A.

Referring to FIGS. 7A and 7B, there is shown a detail view of the soft pliable rear window opening and closing system useful in both embodiments of the invention as discussed above. Pliable soft rear window closure 58 is mounted to soft rear window roller 92 so as to roll up thereon upon energizing drive motor 84. Soft rear window drive belts 82 are driven by soft rear window drive belt reversible motor 84. Motor 84 and roller 80 are mounted at the upper end within upper rear member 18 of frame 12 as illustrated in FIGS. 3–4.

Reversible drive belt motor 84 drives belts 82 for opening or closing window 58 by means of a rod 90 attached to belts 82 at its respective ends. Belts 82 are attached at their outer and inner ends (not shown) to double spools 83 located on opposite sides of window 58 and connected to rollers 80 and the belt outer portions are spooled up on inner spools 85a upon raising window 58 and the belt inner portions are spooled up on outer spools 85b upon lowering window 58 in a manner similar to the operation of the soft top mechanism of FIGS. 6A and 7A. The thickness of the material of window 58 and that of belts 82 is preferably the same so that they wind and unwind together on roller 80 and inner spools 85a.

FIG. 7A illustrates the window mechanism with the window in a downward, closed position, with belts 82 spooled up on outer spools 85b as best seen in FIG. 7B. A single belt and set of double spool 83 and pulley 93 may be used as shown in FIGS. 3–5, above, but the two double spool and pulley arrangement illustrated in FIG. 7A, having pulleys mounted on axle 92 or separately mounted, is a more robust design, avoiding any possible canting of the rod 92, resulting in a smoother operation of the side window during opening or closing. Various bearings and supports for the system of FIGS. 7A and 7B are well within the state of the art and are not shown for purposes of clarity. The soft window operating system for the side windows 56 is similar to that of rear window 58 and are not separately described herein. The electric motors are preferably driven from the vehicle electrical system.

Figure 8:
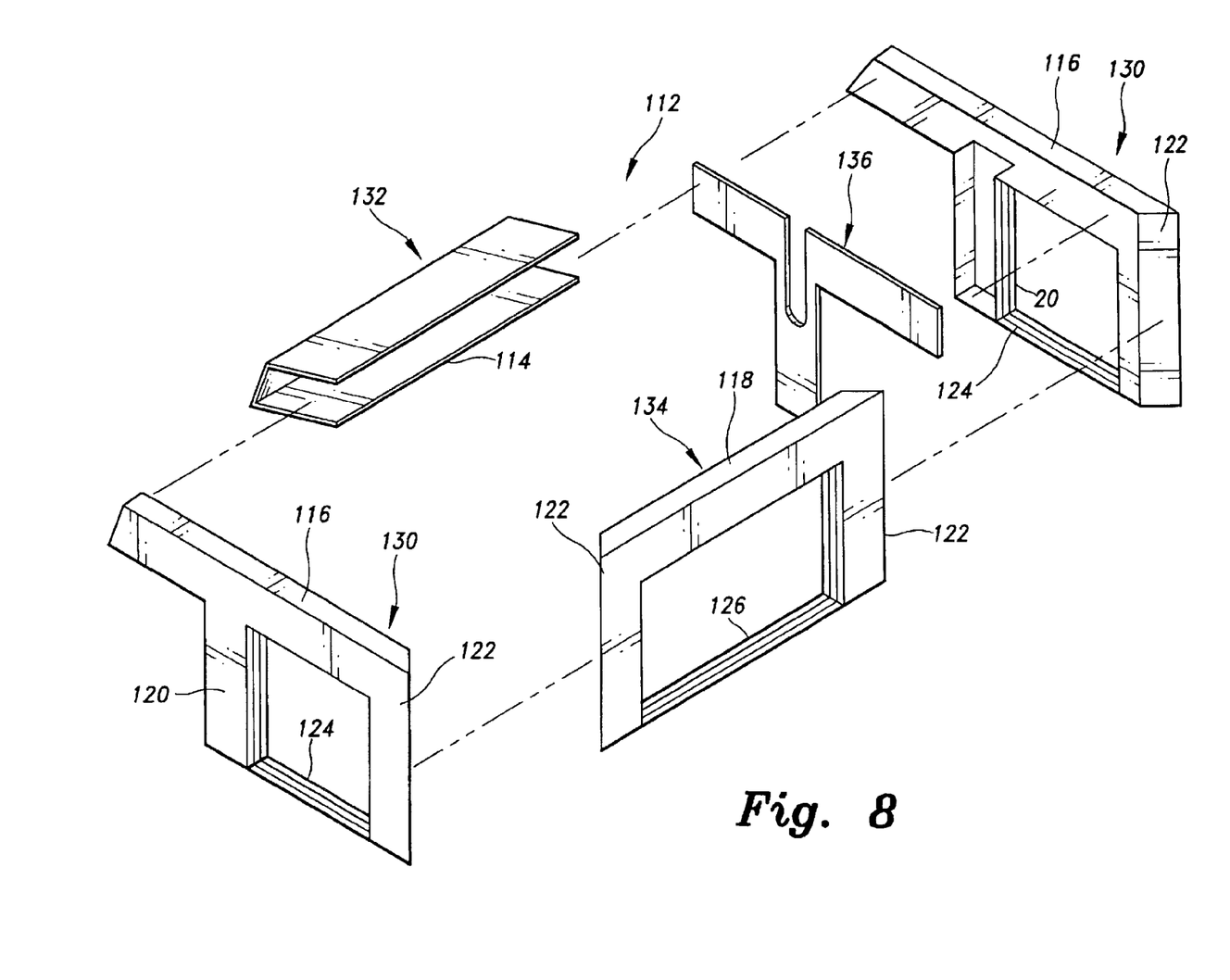
FIG. 8 is an exploded view of the frame of FIG. 5 for assembly around the existing roll bar cage of the vehicle.

Referring to FIG. 8, there is shown an exploded view of representative parts of the frame shell 112 (see FIG. 5). Frame shell 112 is shown without connecting tabs or fasteners which are well known in the art, and includes upper front member 114, shown as front shell portion 132 and upper left and right side members 116 having upright left and right side members 120, partial upright rear members 122 and sill 124 shown as side shell portion 130. Frame shell upper rear member 118, partial upright rear members 122 and sill 126 make up rear shell portion 134. Inner side portion cover 136 is for completing the side shell, once it is slid sideways over the side portion of roll cage RC (see FIG. 6). Two inner side portion covers 136 are required, one for each side shell. The inner cover of the upper rear member of rear shell portion 134 is not shown but is rectangular in shape to match the exposed inner side, thereof in a manner similar to the upper portions of inner side shell portion cover 136.

It is to be understood that the present invention is not limited to the embodiments described above, but encompasses any and all embodiments within the scope of the following claims.

I claim:

1. A hard top/soft top convertible system comprising:
   a frame adapted for replacement of a roll-bar cage in a Jeep-type utility vehicle, said frame including an upper frame member defining a top opening, a left side frame member, a right side frame member and a rear frame member, each said side frame member defining a side window opening, said rear frame member defining a rear window opening;
   a pliable top window closure rotatably mounted within the top opening of said upper frame member;
   a pliable side a window closure rotatably mounted within the side window opening of each said side frame member;
   a pliable rear window closure rotatably mounted within the rear window opening of said rear frame member;
   a rigid top panel removably mounted over the top opening of said upper frame member;
   a rigid side panel removably mounted over the side window opening of each said side frame member;
   a rigid rear panel removably mounted over the rear window opening of said rear frame member; and
   motorized means for rotatably actuating each said pliable window closure between an open position and a closed position within the respective window opening.

2. The hard top/soft top convertible system according to claim 1, wherein said motorized means include a reversible motor operatively connected to a rotatable spindle and at least one drive belt, wherein one end of each said pliable window closure is attached to the rotatable spindle and an opposite end of each said pliable window closure is attached to the at least one drive belt.

3. The hard top/soft top convertible system according to claim 1, wherein said top panel and said side panel are respectively mounted to said upper frame member and said side frame member by removable fasteners.

4. The hard top/soft top convertible system according to claim 3, wherein said removable fasteners include hand screws.

5. The hard top/soft top convertible system according to claim 1, wherein said rear panel includes a top edge and a bottom edge, the top edge having a pair of hinges secured thereto.

6. The hard top/soft top convertible system according to claim 5, further including a handle latch centrally attached along the bottom edge of said rear panel.

7. The hard top/soft top convertible system according to claim 5, wherein said rear panel is mounted to said rear frame member by removable fasteners disposed through said hinges.

8. The hard top/soft top convertible system according to claim 7, wherein said removable fasteners include hand screws.

9. The hard top/soft top convertible system according to claim 1, wherein said top panel, each said side panel and said rear panel are made of a transparent material selected from the group consisting of plastic and glass.

10. The hardtop/soft top convertible system according to claim 1, wherein said frame is fabricated of high strength metal.

11. The hard top/soft top convertible system according to claim 1, wherein each said pliable window closure is made of a transparent material.

12. A hard top/soft top convertible system comprising:
   a frame shell dimensioned and configured for assembly over a roll-bar cage in a Jeep-type utility vehicle, said frame shell including an upper frame member defining a top opening, a left side frame member, a right side frame member and a rear frame member, each said side frame member defining a side window opening, said rear frame member defining a rear window opening;
   a pliable top window closure rotatably mounted within the top opening of said upper frame member;
   a pliable side window closure rotatably mounted within the side window opening of each said side frame member;
   a pliable rear window closure rotatably mounted within the rear window opening of said rear frame member;
   a rigid top panel removably mounted over the top opening of said upper frame member;
   a rigid side panel removably mounted over the side window opening of each said side frame member;
   a rigid rear panel removably mounted over the rear window opening of said rear frame member; and
   motorized means for rotatably actuating each said pliable window closure between an open position and a closed position within the respective window opening.

13. The hard top/soft top convertible system according to claim 12, wherein said motorized means include a reversible motor operatively connected to a rotatable spindle and one end of at least one drive belt, wherein one end of each said pliable window closure is attached to the rotatable spindle and an opposite end of each said pliable window closure is attached to the at least one drive belt.

14. The hard top/soft top convertible system according to claim 13, further including a roller connected to an opposite end of each said at least one drive belt.

15. The hard top/soft top convertible system according to claim 12, wherein each said rigid panel includes a peripheral edge having an elastomeric seal disposed therearound.

16. The hard top/soft top convertible system according to claim 12, wherein each said side frame member and said rear frame member include upright slotted walls defining the side window opening and the rear window opening, respectively, wherein each said pliable side window closure and said pliable rear window closure vertically travels within said respective slotted walls.

17. The hard top/soft top convertible system according to claim 12, wherein said rear panel includes a top edge having a pair of hinges secured thereto.

18. The hard top/soft top convertible system according to claim 17, wherein said rear panel is mounted to said rear frame member by removable fasteners disposed through said hinges.

19. The hard top/soft top convertible system according to claim 18, wherein said removable fasteners include hand screws.

20. The hard top/soft top convertible system according to claim 12, wherein said frame shell is fabricated of a lightweight material.

* * * * *